United States Patent
Hosomi et al.

(10) Patent No.: US 9,993,896 B2
(45) Date of Patent: Jun. 12, 2018

(54) METHOD FOR LASER WELDING OF MATERIALS HAVING DIFFERENT THICKNESSES

(71) Applicant: NISSHIN STEEL CO., LTD., Tokyo (JP)

(72) Inventors: Kazuaki Hosomi, Sakai (JP); Kenji Ogawa, Sakai (JP); Takefumi Nakako, Osaka (JP); Keiji Yamamoto, Osaka (JP)

(73) Assignee: NISSHIN STEEL CO., LTD., Tokyo (JP)

(*) Notice: Subject to any disclaimer, the term of this patent is extended or adjusted under 35 U.S.C. 154(b) by 0 days. days.

(21) Appl. No.: 15/514,088

(22) PCT Filed: Jun. 1, 2015

(86) PCT No.: PCT/JP2015/002761
§ 371 (c)(1),
(2) Date: Mar. 24, 2017

(87) PCT Pub. No.: WO2016/047008
PCT Pub. Date: Mar. 31, 2016

(65) Prior Publication Data
US 2017/0297145 A1    Oct. 19, 2017

(30) Foreign Application Priority Data
Sep. 26, 2014   (JP) ................. 2014-197162

(51) Int. Cl.
*B23K 26/26* (2014.01)
*B23K 26/24* (2014.01)
*B23K 26/242* (2014.01)

(52) U.S. Cl.
CPC ............ *B23K 26/26* (2013.01); *B23K 26/242* (2015.10)

(58) Field of Classification Search
CPC ....... B23K 26/26; B23K 26/24; B23K 26/242
See application file for complete search history.

(56) References Cited

U.S. PATENT DOCUMENTS 5,624,585 A * 4/1997 Haruta ................ B23K 26/073
                                             219/121.63
6,204,469 B1 * 3/2001 Fields, Jr. ............ B23K 26/032
                                             219/121.63

(Continued)

FOREIGN PATENT DOCUMENTS

DE     4022062 C1 * 11/1991
DE     4022062 C1   11/1991

(Continued)

OTHER PUBLICATIONS

Machine translation of Japan Patent document No. 2001-353,587-A, Nov. 2017.*

(Continued)

*Primary Examiner* — Geoffrey S Evans
(74) *Attorney, Agent, or Firm* — Lucas & Mercanti, LLP

(57) ABSTRACT

A laser welding method for welding materials having different thicknesses includes abutting two plates having different thicknesses such that one surface of the thin plate and one surface the thick plate are made flush with each other; and thereafter welding the plates by applying a laser beam to abutting surfaces thereof, wherein the laser beam is directed obliquely relative to an abutting end face of the thick plate, a target position of the laser beam is determined on the abutting end face of the thick plate, and a target position depth D on the abutting end face of the thick plate is determined based on the formula $t/3 \leq D \leq t$ where t is a thickness of the abutting end face of the thin plate.

3 Claims, 4 Drawing Sheets

(56) References Cited

U.S. PATENT DOCUMENTS

| | | | | |
|---|---|---|---|---|
| 6,410,882 | B1 * | 6/2002 | Okada ................ | B23K 26/0643 |
| | | | | 219/121.64 |
| 6,713,712 | B1 * | 3/2004 | Wildmann ............. | B23K 26/24 |
| | | | | 219/121.63 |

FOREIGN PATENT DOCUMENTS

| | | | | |
|---|---|---|---|---|
| DE | 19947104 | A1 | * | 4/2000 |
| EP | 0445633 | A1 | | 9/1991 |
| JP | S63-168286 | A | | 7/1988 |
| JP | H04367304 | A | | 12/1992 |
| JP | 5-131283 | A | * | 5/1993 |
| JP | H07132386 | A | | 5/1995 |
| JP | 8-257773 | A | * | 10/1996 |
| JP | H08-300008 | A | | 11/1996 |
| JP | H09216078 | A | | 8/1997 |
| JP | H11167904 | A | | 6/1999 |
| JP | 2000263262 | A | | 9/2000 |
| JP | 3230228 | B2 | | 11/2001 |
| JP | 2001-353587 | A | * | 12/2001 |
| JP | 2001353587 | A | | 12/2001 |
| JP | 2003-136262 | A | * | 5/2003 |
| JP | 2011-036883 | A | | 2/2011 |
| JP | 2014121714 | A | | 7/2014 |

OTHER PUBLICATIONS

Machine translation of German Patent document No. 4022062-C1, Nov. 2017.*
Office Action dated Sep. 15, 2017 from corresponding Canadian Patent Application No. 2,962,720.
First Examination Report dated Sep. 21, 2017 from corresponding New Zealand Patent Application No. 730053.
European Search Report dated Jul. 24, 2017 from corresponding European Patent Application No. 15843959.6.
European Office Action dated Aug. 14, 2017 from corresponding European Patent Application No. 15843959.6.
Korean Office Action dated Aug. 9, 2017 from corresponding Korean Patent Application No. 10-2017-7010335.
Full machine English translation of JP 2001-353587.
International Search Report dated Aug. 25, 2015 for Application No. PCT/JP2015/002761 and English translation.
Office Action dated Mar. 22, 2018 from corresponding Canadian Patent Application No. 2,962,720.

* cited by examiner

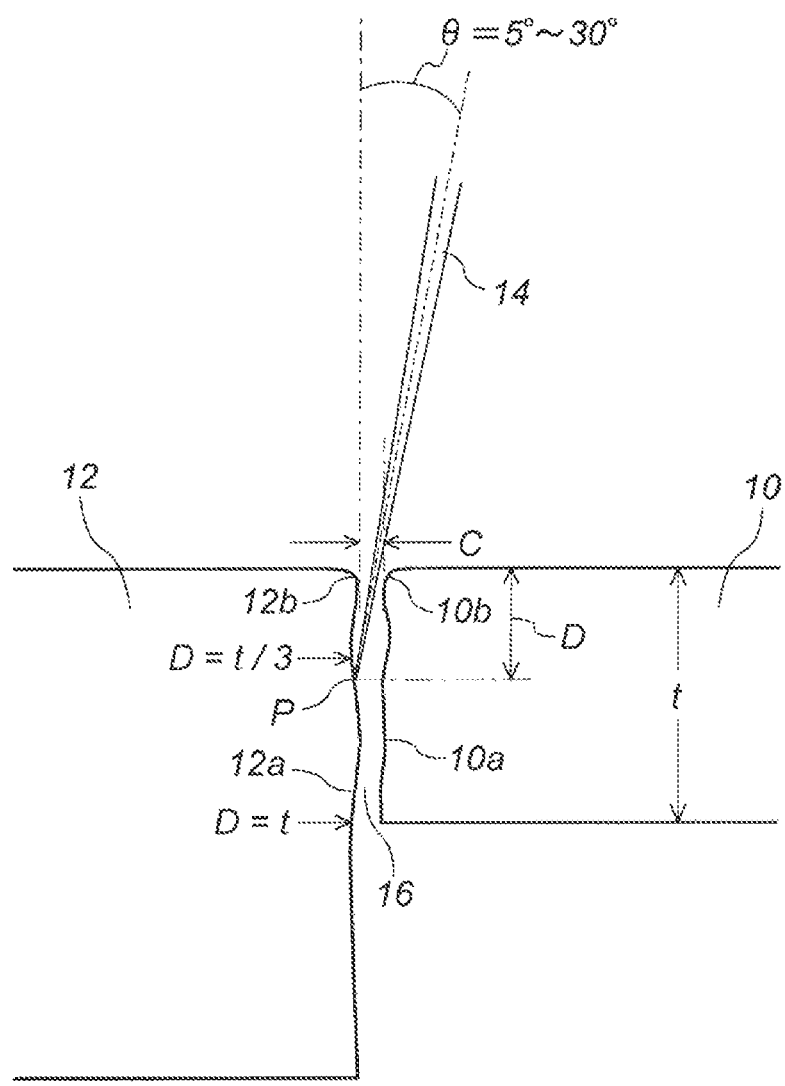

METHOD FOR LASER WELDING OF MATERIALS HAVING DIFFERENT THICKNESSES

CROSS REFERENCE TO RELATED APPLICATION

This Application is a 371 of PCT/JP2015/002761 filed on Jun. 1, 2015, which, in turn, claimed the priority of Japanese Patent Application No. JP 2014-197162 filed on Sep. 26, 2014, both applications are incorporated herein by reference.

TECHNICAL FIELD

The present invention relates to a butt laser welding method of materials having different thicknesses and exhibiting excellent weld strength, and a welded member having different thicknesses.

BACKGROUND ART

Laser is a high-energy density heat source, and thus is used in various fields. In particular, in the field of welding, laser is used for welding of various types of metallic materials such as steel materials due to the characteristic that it allows for high-speed and low-heat input welding and thus causes less thermal distortion and change in quality of a material to be irradiated therewith.

The laser welding method can provide welded joints such as a lap fillet welded joint, a T-shaped joint, and a butt joint, as with other welding methods such as the arc welding method. In the case of obtaining a butt joint using, among these methods, a laser welding method in which a laser beam is applied from the vertical direction of a welding surface, it is necessary to strictly control the target position of the laser beam, and the abutting interval between materials that are welded together (materials to be welded).

This is because the beam diameter of a laser beam is generally as smalls as 0.5 mm or less, although it varies depending on the lasing method, the lens and the like. For this reason, when the target position of the laser beam is shifted as will be described below, incomplete penetration occurs in the welded portion, and, if the abutting interval between the materials that are welded together is wider than the laser beam diameter, the laser beam traveling in the vertical direction passes through the interval and thus cannot achieve welding.

In particular, in the so-called differential thickness welding in which materials having different thicknesses, i.e., materials to be welded having thicknesses different from each other are abutted and welded by using a laser beam, it is necessary to strictly control the target position of the laser beam and the abutting interval between the materials to be welded. In the case of a combination of materials having extremely different thicknesses, for example, as shown in FIG. 1, when the focal position of a laser beam 3 is shifted to the thin plate 1 side, welding failure occurs in which the thin plate 1 is melted to form a molten portion 4, but the thick plate 2 is not melted due to insufficient heat input. In addition, in the case of cutting methods using a shearing machine, a chip saw, or a band saw that are used to cut the materials to be welded, it is difficult to cut straight a cut surface that will serve as a welding surface so as to be at a right angle relative to the surface adjacent thereto, so that sagging or deformation also occurs. In such a case, as shown in FIG. 2, an abutting portion 5 becomes wider than the beam diameter of the laser beam 3, so that the laser beam 3 passes through the gap between the materials to be welded, resulting in the occurrence of welding failure. In order to prevent such a problem, it is necessary to narrow the abutting interval by performing mechanical polish finishing on the cut surface, or to fill the gap with a filler metal, both of which lead to a cost increase.

To solve the above-described problems associated with differential thickness welding, Patent Literatures 1 and 2 below disclose a welding method in which a laser beam is applied obliquely relative to the abutting surfaces of the materials to be welded. This is a laser welding method in which, as shown in FIG. 3, the surfaces of two materials to be welded having different thicknesses on the side to which a laser beam is applied and the surfaces on the opposite side (the bottom surface in FIG. 3) are made flush, the laser target position is made offset inward from a corner 6 of the thick plate 2, and a laser beam 3 is applied obliquely from the thick plate 2 side so as to cause the corner 6 of the thick plate 2 to penetrate to the thin plate 1 side. With such a method, the portion of the corner 6 of the thick plate 2, or in other words, the portion of the thick plate 2 that has a thickness difference from the thin plate 1 is caused to penetrate predominantly. Accordingly, it is not necessary to strictly set the laser target position. Also, it is possible to achieve a good butt joint in a highly efficient manner, without performing machining on the abutting end faces of the materials to be welded or using a filler metal.

CITATION LIST

Patent Literature

[PTL 1]: Japanese Laid-Open Patent Publication No. 7-132386

[PTL 2]: Japanese Laid-Open Patent Publication No. 9-216078

SUMMARY OF INVENTION

Technical Problem

However, with the above-described conventional differential thickness welding, in order to increase the weld strength, the portion of the corner 6 of the thick plate 2 needs to be reliably melted and supplied to the abutting surface (interface) between the thick plate 2 and the thin plate 1. However, this may result in such a problem that an excess part of the molten portion of the thick plate 2 that has been melted into the abutting surface appears as an undesirable back bead on the joint surface (the bottom surface side in FIG. 3), causing a decline in the welding quality. Here, the "back bead" is welded metal (bead) that is exposed on a surface opposite to the surface irradiated with by the heat source.

When the laser beam 3 is made incident obliquely from the thick plate 2 side, the heat of the laser beam 3 is absorbed by the thick plate 2, which is made of a metallic material having high thermal conductivity. Accordingly, there is a significant heat loss of the laser beam 3, so that it can be hardly said that welding is performed efficiently even if the portion of the corner 6 of the thick plate 2 is successfully melted.

In view of such circumstances, it is the main object of the present invention to provide a laser welding method of materials having different thicknesses that can efficiently achieve excellent weld strength and finish, regardless of the thickness of a thick plate.

Solution to Problem

As a result of extensive studies, the inventors have found the usefulness of a laser welding method in which welding surfaces of two plate materials having different thicknesses are butted such that surfaces adjacent to the welding surfaces are flush with each other, and thereafter a laser beam is made incident obliquely on the welding surfaces from the side of the surface of a thin plate, which surface is one of the surfaces that are made flush with each other, and also have made findings that excellent weld strength can be achieved, regardless of the thickness of the thick plate, by controlling the laser target position, the incident angle, and the abutting interval within a proper range, thus completing the present invention.

In the present invention, in a welded joint formed by welding at a later time, abutting surfaces formed by abutting one surface of each of two materials to be welded having different thicknesses so as to be flush with each other, the flush surface (the upper surface in FIG. 4) may be referred to as "surface of the welded joint", and the surface in which a height difference is produced (the lower surface in FIG. 4) may be referred to "back surface of the welded joint".

That is, the present invention is characterized by a laser welding method of materials having different thicknesses, including: abutting a thin plate 10 and a thick plate 12 having different thicknesses such that one surface of the thin plate 10 and one surface the thick plate 12 are made flush with each other; and thereafter welding the thin plate 10 and the thick plate 12 by applying a laser beam 14 to the abutting surfaces, wherein the laser beam 14 is made incident obliquely from the flush surface of the thin plate 10 toward an abutting end face 12a of the thick plate 12; a target position P of the laser beam 14 is set on the abutting end face 12a of the thick plate 12; and a target position depth D in the plate from a surface thereof on the incident side of the laser beam 14 is set within a range of the following expression (1):

$$t/3 \leq D \leq t \quad (1)$$

(where t is a thickness, in a planar direction, of an abutting end face 10a of the thin plate 10, and D and t are both given in mm).

According to this aspect of the invention, the laser beam 14 is made incident obliquely from the flush surface of the thin plate 10 toward the abutting end face 12a of the thick plate 12. Accordingly, even when an excess part of the molten portion of the thick plate 12 that has been melted appears on the back surface of the welded joint as an undesirable back bead, the back bead is formed on the back surface of the welded joint on which a height difference is produced by the differential thickness portion of the thick plate 12, so that there will be no unsatisfactory external appearance, and the welding quality will not be reduced.

In the present invention, it is preferable that the laser beam 14 has an incident angle θ that is inclined to the thin plate 10 side by 5° to 30°, relative to the abutting end face 12a of the thick plate 12, and it is preferable that an abutting interval C between the thick plate 12 and the thin plate 10 is 1.0 mm or less.

Another aspect of the present invention is characterized by a welded member having different thicknesses welded by the laser welding method of materials having different thicknesses according to the present invention, wherein penetration has occurred in 50% or more of an area of the abutting surfaces.

Advantageous Effects of Invention

According to the present invention, it is possible to provide a laser welding method of materials having different thicknesses that can efficiently provide excellent weld strength and finish, regardless of the thickness of the thick plate, and a welded member having different thicknesses produced by using the aforementioned method and which has excellent welding quality.

BRIEF DESCRIPTION OF DRAWINGS

FIG. 4 is a diagram schematically showing a laser welding method of materials having different thicknesses according to the present invention, in which the laser target position, the laser irradiation angle, and the abutting interval are defined.

BEST MODE FOR CARRYING OUT THE INVENTION

Figure 1:
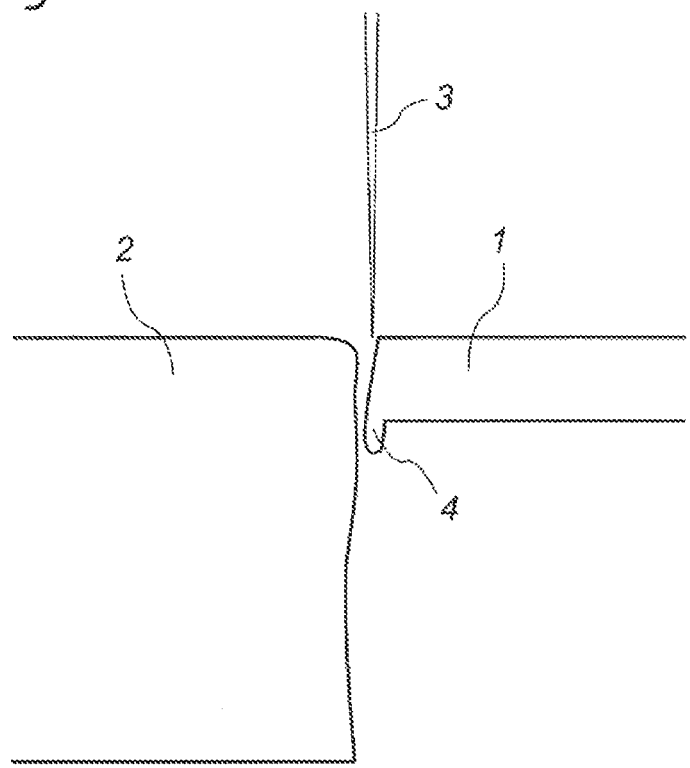
FIG. 1 is a diagram showing a cross section of a welded portion in the case where a laser target position is shifted to the thin plate side, according to the hitherto known art.
Figure 2:
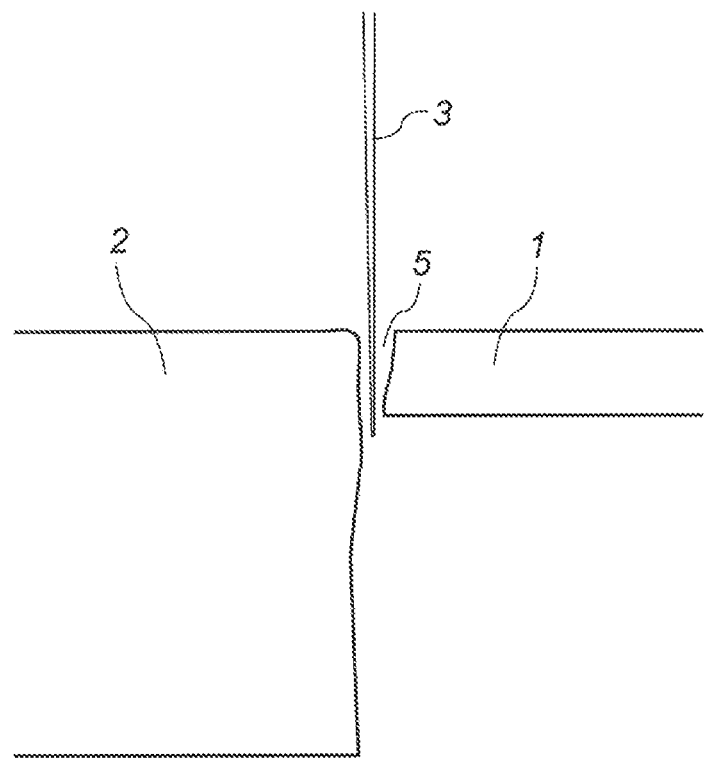
FIG. 2 is a diagram showing a cross section of a welded portion in the case where an abutting interval is wide, according to the hitherto known art.
Figure 3:
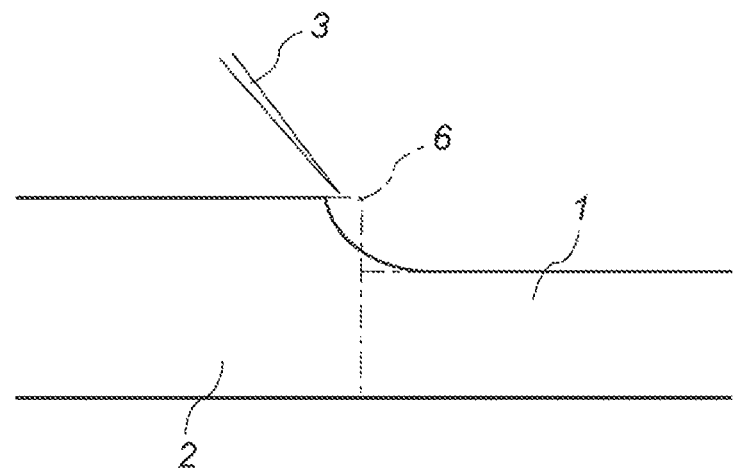
FIG. 3 is a diagram showing a cross section of a hitherto known welded portion having a height difference.

Hereinafter, the present invention will be described with reference to the drawings. FIG. 4 is a diagram schematically showing a laser welding method of materials having different thicknesses according to the present invention. It should be noted that in FIG. 4, the unevenness of an end face 10a of a thin plate 10, the unevenness of an end face 12a of a thick plate 12, and an abutting interval C between the thin plate 10 and the thick plate 12 are depicted in an exaggerated manner.

The present invention is directed to a laser welding method of materials having different thicknesses, including: abutting a thin plate 10 and a thick plate 12 such that one surface of the thin plate 10 and one surface the thick plate 12 are made flush with each other; and thereafter welding the thin plate 10 and the thick plate 12 by applying a laser beam 14 to the abutting surfaces. In particular, the present invention is characterized in that the laser beam 14 is made incident obliquely from the flush surface of the thin plate 10 toward an abutting end face 12a of the thick plate 12, a target position P of the laser beam 14 is set on the abutting end face 12a of the thick plate 12, and a target position depth D in the plate from a surface thereof on the incident side of the beam 14 is set within a predetermined range described below.

In the following, conditions for the butt laser welding according to the present invention will be described in detail.

In the present invention, as shown in FIG. 4, the thin plate 10 and the thick plate 12 are abutted such that one surface of the thin plate 10 and one surface of the thick plate 12 are flush with each other, and thereafter the laser beam 14 is applied obliquely from the flush surface of the thin plate 10 toward the abutting end face 12a of the thick plate 12. Therefore, no constraint is imposed on the thickness of the thick plate 12.

In the present invention, since the target position P of the laser beam 14 is set on the abutting end face 12a of the thick plate 12, there is little influence on penetration even when the position of the abutting end face 10a of the thin plate 10 fluctuates. Meanwhile, in the case where the target position P of the laser is set on the abutting end face 10a of the thin plate 10 or a corner portion 10b of the end face 10a, a target position detector is necessary. Accordingly, there will be an increase in the facility cost, and, moreover, penetration becomes unstable when the interval of the abutting portion 16 fluctuates.

The target position depth D represents the depth from the surface of the plate on the side where the laser beam 14 is made incident (i.e., the flush surface of the thin plate 10) to the target position P of the laser beam 14 on the abutting end face 12a of the thick plate 12, and is preferably in the range represented by the following expression (1).

$$t/3 \leq D \leq t \quad (1)$$

(where t is the thickness, in the planar direction, of the abutting end face 10a of the thin plate 10, and D and t are both given in mm).

When the target position depth D is shallower than ⅓ of the thickness t of the thin plate 10, the amount of penetration of the materials to be welded is decreased. Conversely, when the target position depth D is larger than t, only the thin plate 10 is melted and the melting of the thick plate 12 becomes insufficient.

As shown in FIG. 4, the incident angle θ of the laser beam 14 is defined as an angle between the vertical line from a corner 12b on the upper surface of the thick plate 12 and the center of the laser beam 14. Specifically, this angle is preferably inclined to the thin plate 10 side by 5° to 30°, relative to the abutting end face 12a of the thick plate 12. The reason is as follows. When the incident angle θ of the laser beam 14 is less than 5°, the amount of the laser beam 14 that passes through increases as the abutting interval C is widened, resulting in an insufficient heat input. Conversely, when the incident angle θ exceeds 30°, the laser beam 14 is applied only to the thin plate 10, resulting in insufficient melting of the thick plate 12.

The abutting interval C in the present invention refers to a gap formed between the abutting end face 10a of the thin plate 10 and the abutting end face 12a of the thick plate 12, and it is preferable that the maximum value of the abutting interval C between the welding start position to the welding end position is limited to 1.0 mm or less. The reason is as follows. When the abutting interval C exceeds 1.0 mm, the welded portion becomes thin and coarse, resulting in insufficient weld strength. When the incident angle θ of the laser beam 14 is small, the passing-through of the laser beam 14 occurs, so that it may not possible to perform welding.

In the laser welding method of materials having different thicknesses according to the present invention, laser welding conditions other than those described above, including, for example, the laser wavelength, the laser output, the laser beam diameter, and the welding speed are not particularly limited. These conditions are selected as appropriates according to the type, the thickness, and the like of the materials to be welded, which will be described later.

In the present invention, the types of materials to be welded, namely, the thin plate 10 and the thick plate 12 serving as the materials having different thicknesses are not particularly limited. Examples of the materials to be welded include low-carbon steel, stainless steel, and any of these steel materials coated with Zn-based plating, Al-based plating, Zn—Al-based alloy plating, Al—Si-based alloy plating, Zn—Al—Si-based alloy plating, Zn—Al—Mg-based alloy plating, Zn—Al—Mg—Si-based alloy plating, or the like. The present invention is also applicable to differential thickness welding not only between the aforementioned steel materials, but also between nonferrous metals such as Al, as well as between a steel material and a nonferrous metal. Furthermore, the method of cutting the materials to be welded is not limited. A common cutting method using a shearing machine, a chip saw, a band saw, or the like may be used. After cutting, mechanical polish finishing may be performed.

In the present invention, the thickness of the thick plate 12 is not limited as described above. The shape of the thick plate 12 is not limited to a plate shape, and may be a block shape.

On the other hand, the thickness t of the thin plate 10 is preferably 6 mm or less. The reason is as follows. When the thickness t of the thin plate 10 is thicker than 6 mm, a large-output laser welding machine is necessary, leading to an increase in the facility cost. Also, when the thin plate 10 becomes thick in this manner, the welding speed is slowed, resulting in a decline in the productivity.

In a welded member having different thicknesses produced by using the laser welding method of materials having different thicknesses as described above, it is preferable that penetration has occurred in 50% or more of the area of the abutting surface. The reason is as follows. The portion that has been caused to penetrate during welding is hardened by high heat of the laser beam 14, and thus has increased hardness and tensile strength. As a result, when penetration has occurred in 50% or more of the area of the abutting surface, it is possible to achieve a weld strength that can cause fracture of the thin plate 10 when a force is applied in a direction to move the thin plate 10 and the thick plate 12 of the welded member having different thicknesses away from each other.

EXAMPLES

In the following, the present invention will be described more specifically by way of examples, but the present invention is not limited to the examples.

First, low-carbon steels, SUS 304, an Al (aluminum) alloy listed in Table 1 were prepared as sample materials. Among these, as the low-carbon steels, a low-carbon steel with no plating and a low-carbon steel coated with a molten Zn-6 mass % Al-3 mass % Mg plating in a deposition amount per side of 90 g/m$^2$ were prepared. Then, the sample materials having a thickness of 6 mm or less were cut by using a shearing machine, a chip saw, or a band saw, and the sample materials having a thickness of 10 mm or more were cut by using a band saw so as to cut the sample materials into a size of 100 mm in width and 100 mm in length. In addition, the cut end faces of some of the sample materials were subjected to mechanical polish finishing.

Here, the material type symbols listed in Table 1 are used to represent the material types of the thin plates and the thick plates in Table 2-1 to Table 2-3.

TABLE 1

| Classification | Type | Thickness (mm) | Plating | Material type symbol |
|---|---|---|---|---|
| Thick plate | Low-carbon steel | 2-50 | Absent | A1 |
| | Low-carbon steel | 2-50 | Present (molten Zn-6 mass % Al-3 mass % Mg plating) | A1M |
| | SUS304 | 2-50 | Absent | A2 |
| | Al alloy | 2-50 | Absent | A3 |

TABLE 1-continued

| Classification | Type | Thickness (mm) | Plating | Material type symbol |
|---|---|---|---|---|
| Thin plate | Low-carbon steel | 1-6 | Absent | U1 |
| | Low-carbon steel | 1-6 | Present (molten Zn-6 mass % Al-3 mass % Mg plating) | U1M |
| | SUS304 | 1-6 | Absent | U2 |
| | Al alloy | 1-6 | Absent | U3 |

Subsequently, prior to laser welding, the maximum abutting interval of the abutting portion in a width of 100 mm was measured with a feeler gauge. If the feeler gauge, which had a thickness of 0.1 mm, could not be inserted in the abutting portion, the maximum abutting interval was determined as 0.1 mm or less. The obtained results are shown in Table 2-1 to Table 2-3.

Then, butt laser welding was performed by using a fiber laser welding machine with a maximum output of 7 kW under various conditions described below.

A tensile testing sample having a width of 30 mm was collected from each of the butt laser-welded samples, and the sample was subjected to a tensile test in compliance with JIS Z-2241. Also, the cross section of a welded intermediate portion of each of the butt laser-welded samples was observed with an optical microscope, and the penetration state thereof was observed. On the basis of the results of the tensile test and the observation results of the penetration state, a comprehensive evaluation was made on the laser welded portion. The criteria for this comprehensive evaluation are shown below.

Excellent: The base material fractured on the thin plate 1 side during the tensile test, and the thickness of the molten portion of the welded portion was 70 to 100% of the thickness of the thin plate.

Good: The base material fractured on the thin plate 1 side during the tensile test, and the thickness of the molten portion of the welded portion was 60 to 69% of the thickness of the thin plate.

Fair: The base material fractured on the thin plate 1 side during the tensile test, and the thickness of the molten portion of the welded portion was 45 to 59% of the thickness of the thin plate.

Poor: The welded portion fractured during the tensile test.

As a result of this comprehensive evaluation, it was clarified that the more the thickness of the molten portion increases, the more it is preferable since the tensile strength and the fatigue strength increase, and the gaping when the welded portion undergoes tensile deformation decreases.

Table 2-1 to Table 2-3 show the laser welding conditions, the maximum abutting interval, and the results of the comprehensive evaluation. It should be noted that "t" in the column of the laser target position depth D is the thickness of the thin plate 10.

TABLE 2

| | Thick plate | | Thin plate | | | | | | | |
|---|---|---|---|---|---|---|---|---|---|---|
| No. | Material type symbol | Plate thickness (mm) | Material type symbol | Plate thickness: t (mm) | Laser output (kW) | Welding speed (m/min) | Laser target position depth: D (mm) | Laser incident angle (°) | Maximum abutting interval (mm) | Comprehensive evaluation |
| <<Examples>> | | | | | | | | | | |
| 1 | A1 | 2 | U1 | 1 | 4 | 2.0 | t/3 | 5 | 0.1 or less | Excellent |
| 2 | A1 | 6 | U1 | 2 | 4 | 1.5 | t/2 | 10 | 0.1 or less | Excellent |
| 3 | A1 | 10 | U1 | 3 | 5 | 1.5 | t/2 | 15 | 0.2 | Excellent |
| 4 | A1 | 30 | U1 | 4 | 7 | 1.0 | t | 25 | 0.3 | Excellent |
| 5 | A1 | 50 | U1 | 6 | 7 | 1.0 | t | 30 | 0.2 | Excellent |
| 6 | A1 | 10 | U1 | 1 | 5 | 2.0 | t/3 | 10 | 1.3 | Good |
| 7 | A1 | 20 | U1 | 2 | 4 | 1.5 | t/3 | 5 | 1.5 | Good |
| 8 | A1 | 35 | U1 | 3 | 4 | 1.5 | t/2 | 15 | 1.2 | Good |
| 9 | A1 | 40 | U1 | 4 | 5 | 1.5 | t | 30 | 1.1 | Good |
| 10 | A1 | 50 | U1 | 6 | 7 | 1.0 | t | 20 | 1.1 | Good |
| 11 | A1 | 6 | U1 | 1 | 5 | 2.0 | t/3 | 4 | 1.2 | Fair |
| 12 | A1 | 15 | U1 | 2 | 6 | 1.0 | t/2 | 32 | 1.1 | Fair |
| 13 | A1 | 20 | U1 | 3 | 7 | 1.0 | t | 33 | 1.2 | Fair |
| 14 | A1 | 30 | U1 | 4 | 7 | 1.0 | t | 35 | 1.1 | Fair |
| 15 | A1 | 50 | U1 | 6 | 7 | 1.0 | t | 35 | 1.2 | Fair |
| 16 | A1M | 2 | U1M | 1 | 4 | 2.0 | t/3 | 5 | 0.1 or less | Excellent |
| 17 | A1M | 6 | U1M | 2 | 4 | 2.0 | t/2 | 10 | 0.2 | Excellent |
| 18 | A1M | 15 | U1M | 3 | 5 | 1.0 | t | 30 | 0.5 | Excellent |
| 19 | A1M | 25 | U1M | 4 | 6 | 1.2 | t | 20 | 1.0 | Excellent |
| 20 | A1M | 50 | U1M | 6 | 7 | 1.5 | t | 25 | 1.0 | Excellent |
| 21 | A1M | 6 | U1M | 1 | 4 | 1.0 | t/3 | 5 | 1.2 | Good |
| 22 | A1M | 10 | U1M | 2 | 4 | 1.5 | t/2 | 15 | 1.1 | Good |
| 23 | A1M | 15 | U1M | 3 | 5 | 1.0 | t | 25 | 1.3 | Good |
| 24 | A1M | 20 | U1M | 4 | 7 | 1.5 | t | 10 | 1.1 | Good |
| 25 | A1M | 50 | U1M | 6 | 7 | 1.0 | t | 30 | 1.5 | Good |
| 26 | A1M | 3 | U1M | 1 | 4 | 1.5 | t/3 | 4 | 1.1 | Fair |
| 27 | A1M | 6 | U1M | 2 | 4 | 0.7 | t/2 | 4 | 1.1 | Fair |
| 28 | A1M | 15 | U1M | 3 | 6 | 1.5 | t/2 | 32 | 1.1 | Fair |
| 29 | A1M | 20 | U1M | 4 | 5 | 0.7 | t | 34 | 1.3 | Fair |
| 30 | A1M | 50 | U1M | 6 | 6 | 0.7 | t | 37 | 1.1 | Fair |
| 31 | A2 | 2 | U2 | 1 | 4 | 1.0 | t/3 | 5 | 0.8 | Excellent |
| 32 | A2 | 50 | U2 | 6 | 7 | 1.5 | t | 30 | 1.0 | Excellent |
| 33 | A2 | 10 | U1 | 3 | 5 | 1.0 | t/2 | 20 | 1.2 | Good |
| 34 | A2 | 35 | U1M | 5 | 7 | 0.7 | t/2 | 10 | 1.1 | Good |
| 35 | A1 | 20 | U2 | 3 | 4 | 1.2 | t | 32 | 1.1 | Fair |

TABLE 2-continued

| | Thick plate | | Thin plate | | | | | | | |
|---|---|---|---|---|---|---|---|---|---|---|
| No. | Material type symbol | Plate thickness (mm) | Material type symbol | Plate thickness: t (mm) | Laser output (kW) | Welding speed (m/min) | Laser target position depth: D (mm) | Laser incident angle (°) | Maximum abutting interval (mm) | Comprehensive evaluation |
| 36 | A1 | 50 | U2 | 5 | 7 | 1.0 | t | 33 | 1.2 | Fair |
| 37 | A3 | 2 | U3 | 1 | 4 | 2.0 | t/3 | 30 | 1.0 | Excellent |
| 38 | A3 | 15 | U3 | 3 | 5 | 1.5 | t/2 | 5 | 0.3 | Excellent |
| 39 | A3 | 20 | U3 | 3 | 5 | 1.5 | t/2 | 30 | 1.2 | Good |
| 40 | A3 | 35 | U3 | 4 | 5 | 1.0 | t/2 | 5 | 1.2 | Good |
| 41 | A3 | 40 | U3 | 5 | 6 | 1.0 | t | 4 | 1.1 | Fair |
| 42 | A3 | 50 | U3 | 6 | 7 | 1.0 | t | 31 | 1.1 | Fair |
| | | | | | <<Comparative examples>> | | | | | |
| 43 | A1 | 2 | U1 | 1 | 4 | 2.0 | t/5 | 25 | 0.5 | Poor |
| 44 | A1 | 6 | U1 | 3 | 4 | 1.5 | t/4 | 20 | 0.3 | Poor |
| 45 | A1 | 20 | U1 | 6 | 5 | 1.0 | 1.2t | 25 | 0.5 | Poor |
| 46 | A1 | 50 | U1 | 6 | 7 | 0.8 | 1.3t | 20 | 0.3 | Poor |
| 47 | A1 | 15 | U1 | 3 | 4 | 1.0 | t/4 | 3 | 0.7 | Poor |
| 48 | A1 | 20 | U1 | 4 | 4 | 0.7 | t/5 | 2 | 0.4 | Poor |
| 49 | A1 | 30 | U1 | 6 | 7 | 0.7 | 1.1t | 35 | 0.1 or less | Poor |
| 50 | A1 | 50 | U1 | 6 | 7 | 1.0 | 1.2t | 40 | 0.2 | Poor |
| 51 | A1M | 6 | U1M | 1 | 4 | 1.0 | t/6 | 45 | 1.1 | Poor |
| 52 | A1M | 10 | U1M | 3 | 4 | 1.5 | t/4 | 50 | 1.5 | Poor |
| 53 | A1M | 20 | U1M | 4 | 4 | 1.0 | 1.1t | 4 | 1.5 | Poor |
| 54 | A1M | 50 | U1M | 6 | 7 | 0.7 | 1.2t | 35 | 1.5 | Poor |

As shown in Nos. 1 to 5 and 16 to 20 of Table 2-1, and Nos. 31, 32, 37 and 38 of Table 2-2, the examples in which all of the laser target position depth D, the laser incident angle, and the abutting interval were within the range of the present invention were "excellent" in the comprehensive evaluation and achieved good weld strength and penetration. In addition, the other examples achieved good weld strength although penetration was shallow.

In contrast, the welded portion fractured during the tensile test due to lack of penetration in the comparative examples shown in Nos. 43 to 54 of Table 2-3 in which all of the laser target position depth D, the laser incident angle, and the abutting interval were outside the range of the present invention.

REFERENCE SIGNS LIST

10 thin plate
10a abutting end face of (thin plate)
12 thick plate
12a abutting end face of (thick plate)
14 laser beam
C abutting interval (between thick plate and thin plate)
D target position depth
P target position of laser beam
t thickness, in planar direction, of abutting end face of thin plate
θ incident angle of laser beam

The invention claimed is:

1. A laser welding method for welding materials having different thicknesses, comprising:
abutting a first end face of a thin plate and a second end face of a thick plate, the thin plate and the thick plate having different thicknesses, such that a first surface of the thin plate and a second surface the thick plate are made flush with each other, thereby defining a flush surface comprising the first surface and the second surface; and
welding the thin plate and the thick plate by applying a laser beam to the second end face of the thick plate, wherein:
the laser beam is directed obliquely relative to the second end face of the thick plate toward a target position on the second end face of the thick plate, the target position having a target position distance D from the flush surface determined within a range of the following expression $$t/3 \leq D \leq t \quad (1)$$

wherein t is a thickness, in a planar direction perpendicular to the flush surface, of the first end face of the thin plate, D and t are both expressed in millimeters, and the laser beam irradiates the target position.

2. The laser welding method according to claim 1, wherein
the laser beam forms an angle having a value between 5° and 30°, relative to the second end face of the thick plate.

3. The laser welding method according to claim 1, wherein
an abutting interval between the thick plate and the thin plate is 1.0 mm or less.

* * * * *